United States Patent
Kim

(10) Patent No.: US 8,808,919 B2
(45) Date of Patent: Aug. 19, 2014

(54) NEGATIVE ELECTRODE ACTIVE MATERIAL, NEGATIVE ELECTRODE HAVING THE SAME AND LITHIUM SECONDARY BATTERY

(75) Inventor: Bong-Chull Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 495 days.

(21) Appl. No.: 12/628,586

(22) Filed: Dec. 1, 2009

(65) Prior Publication Data
US 2010/0136432 A1    Jun. 3, 2010

(30) Foreign Application Priority Data
Dec. 1, 2008  (KR) .................... 10-2008-0120514

(51) Int. Cl.
*H01M 4/58* (2010.01)
(52) U.S. Cl.
USPC ........................................ 429/231.8
(58) Field of Classification Search
USPC ........................................ 429/231.8
See application file for complete search history.

(56) References Cited

U.S. PATENT DOCUMENTS

| | | | |
|---|---|---|---|
| 6,391,495 | B1 | 5/2002 | Choi et al. |
| 6,589,696 | B2 | 7/2003 | Matsubara et al. |
| 7,618,678 | B2 | 11/2009 | Mao et al. |
| 7,776,472 | B2 | 8/2010 | Kim et al. |
| 2005/0074672 | A1 | 4/2005 | Matsubara et al. |
| 2005/0136330 | A1* | 6/2005 | Mao et al. ............. 429/231.95 |
| 2006/0134516 | A1* | 6/2006 | Im et al. ............... 429/218.1 |
| 2007/0154811 | A1 | 7/2007 | Oh et al. |
| 2007/0166616 | A1* | 7/2007 | Kim et al. ............. 429/231.8 |
| 2008/0220329 | A1* | 9/2008 | Kojima et al. ........... 429/188 |

FOREIGN PATENT DOCUMENTS

| | | |
|---|---|---|
| CN | 1894811 A | 1/2007 |
| CN | 101005130 A | 7/2007 |
| EP | 1 903 628 | 3/2008 |
| JP | 2000-203818 | 7/2000 |
| JP | 3124272 | 10/2000 |
| JP | 3305995 | 5/2002 |
| JP | 2004-59386 A | 2/2004 |
| JP | 2004-063411 A | 2/2004 |
| JP | 2005-108774 A | 4/2005 |
| JP | 2005-310760 A | 11/2005 |
| JP | 2007-184263 A | 7/2007 |
| JP | 2007-519182 A | 7/2007 |
| JP | 2007-194201 A | 8/2007 |
| JP | 2008-186732 | 8/2008 |
| JP | 2009-181767 A | 8/2009 |

(Continued)

OTHER PUBLICATIONS

European Search Report dated Mar. 3, 2010, in corresponding European Patent Application No. 09177629.4.

(Continued)

*Primary Examiner* — Muhammad Siddiquee
(74) *Attorney, Agent, or Firm* — Knobbe, Martens, Olson & Bear, LLP

(57) ABSTRACT

A lithium secondary battery including a positive electrode having a positive electrode active material, a negative electrode having a negative electrode active material, a separator separating the positive electrode from the negative electrode and an electrolyte. The negative electrode active material includes a graphite core particle, a carbon layer coating the graphite core particle, and metal particles dispersed in the carbon layer.

5 Claims, 2 Drawing Sheets

(56) References Cited

FOREIGN PATENT DOCUMENTS

| | | |
|---|---|---|
| KR | 10-2004-0082803 | 9/2004 |
| KR | 10-0453896 | 10/2004 |
| KR | 10-0589309 | 6/2006 |
| KR | 10-2007-0012385 | 1/2007 |
| KR | 10-0684729 | 2/2007 |
| KR | 10-0738054 | 7/2007 |
| KR | 10-0745733 | 7/2007 |
| WO | WO2005/096333 | 10/2005 |

OTHER PUBLICATIONS

Abstract of Japanese Patent No. 2001-160392.
Abstract of Japanese Patent No. 10-236809.
Abstract of Korean Patent No. 10-2001-0113448.
Abstract of Korean Patent No. 10-2002-0070764.
Abstract of Korean Patent No. 10-2006-0048753.
Abstract of Korean Patent No. 10-2006-0069738.
Abstract of Korean Patent No. 10-2007-0034254.
Fourth Office Action issued on Oct. 12, 2013 by the State Intellectual Property Office of P.R. China in corresponding Chinese Patent Application No. 200910246086.5.
Notification of the Second Office Action issued by the State Intellectual Property Office of P.R. China dated Oct. 23, 2012, 9 pages.
Third Office Action issued by the State Intellectual Property Office of P.R. China dated Apr. 17, 2013 in the corresponding Chinese Patent Application No. 200910246086.5.

* cited by examiner

NEGATIVE ELECTRODE ACTIVE MATERIAL, NEGATIVE ELECTRODE HAVING THE SAME AND LITHIUM SECONDARY BATTERY

CROSS-REFERENCE TO RELATED APPLICATIONS

This application claims the benefit of Korean Patent Application No. 10-2008-0120514, filed Dec. 1, 2008, the disclosure of which is hereby incorporated herein, by reference.

BACKGROUND OF THE INVENTION

1. Field of the Invention

Aspects of the present invention relate to a negative electrode active material, a negative electrode having the same, and a lithium secondary battery including the negative electrode.

2. Description of the Related Art

While lithium metals are commonly used as negative electrode active materials, these metals can cause a short circuit in a battery, due to the formation of dendrites, resulting in a risk of explosion. For this reason, carbonaceous materials have recently been used in place of lithium metals, as negative electrode active materials.

Carbonaceous negative electrode active materials for a lithium battery include crystalline carbons, such as natural graphite and artificial graphite, and amorphous carbons, such as soft carbon and hard carbon. Amorphous carbon has a high capacity, but is highly irreversible in a charge/discharge cycle. Crystalline carbon, e.g., graphite, has a sufficiently high theoretical capacity (372 mAh/g) to be used as a negative electrode active material, but is rapidly degraded, resulting in a short lifespan. Also, a carbonaceous active material cannot be use in a negative electrode of a high capacity lithium battery, since its theoretical capacity does not exceed 372 mAh/g.

In an effort to overcome these problems, metal-graphite composite negative electrode active materials, including graphite and, for example, aluminum (Al), germanium (Ge), silicon (Si), tin (Sn), zinc (Zn) and/or lead (Pb), are being actively studied for use in lithium batteries. However, in such composite negative electrode active materials, lithium ions may be intercalated into inorganic particles, such as Si or Sn, included in the composite negative electrode active material, during charging, and thus, the inorganic particles may expand by about 300 to 400%.

Further, when lithium ions are deintercalated during discharging, the inorganic particles contract. As the charge/discharge cycles are repeated, the conductivity of such active materials may be decreased, due to the volume changes of the inorganic particles. In addition, such a negative electrode active material may separate from a negative electrode collector, resulting in a drastic decrease in cycle-life.

SUMMARY OF THE INVENTION

Aspects of the present invention provide a negative electrode active material having improved cycle-life characteristics, a negative electrode having the same, and a lithium secondary battery including the negative electrode. The negative electrode active material can include a metal-carbon composite that is resistant to volume changes, during charging and discharging.

According to one aspect of the present invention, provided is a negative electrode active material including: a graphite core particle; a carbon layer coating the graphite core particle; and metal particles dispersed in the carbon layer.

According to another aspect of the present invention, provided is a negative electrode including a negative electrode collector that is coated with the negative electrode active material.

According to still another aspect of the present invention, provided is a lithium secondary battery including a positive electrode having a positive electrode active material, the negative electrode, a separator separating the positive electrode from the negative electrode, and an electrolyte.

According to aspects of the present invention, the negative electrode active material may include a metal-carbon composite having a porosity of from 0 to 0.08 cc/g.

According to aspects of the present invention, the negative electrode active material may have a porosity of from 0 to 0.03 cc/g.

According to aspects of the present invention, the graphite core particle may include a metal-carbon composite having a porosity of from 0 to 0.07 cc/g.

According to aspects of the present invention, the graphite core particle may have a porosity of from 0 to 0.025 cc/g.

According to aspects of the present invention, the carbon layer may be coated to a thickness of 1 to 4 μm.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
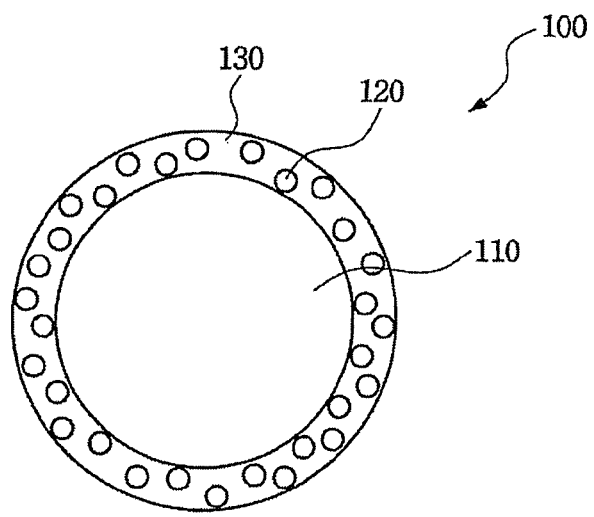
FIG. 1 is a schematic cross-sectional view of a negative electrode active material, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1 is a schematic cross-sectional view of a negative electrode active material 100, according to an exemplary embodiment of the present invention. Referring to FIG. 1, the negative electrode active material 100 includes a graphite core particle 110, a carbon layer 130 coating the graphite core particle 110, and metal particles 120 dispersed in the carbon layer 130. The core particle 110, carbon layer 130, and metal particles 120 can be collectively referred to as a metal-graphite composite.

The graphite core particle 110 is capable of reversibly intercalating and deintercalating lithium ions. The graphite core particle 110 may be formed of at least one selected from the group consisting of artificial graphite, natural graphite, graphitized carbon fiber, graphitized mesocarbon microbeads, and amorphous carbon.

The graphite core particle 110 may have an average diameter of from about 1 to 20 μm. When the average diameter of the graphite core particle 110 is less than about 1 μm, the metal particles 120 disposed in the carbon layer 130 may not be disposed on or around the surface of the graphite core particle 110. In other words, the metal particles 120 may not be sufficiently adhered to the graphite core particle 110 and/or dispersed in the carbon layer 130. However, when the average diameter of the graphite core particle 110 is more than about 20 μm, the carbon layer 130 may not form a uniform coating. The graphite core particle 110 may be included in a negative electrode of a battery. The graphite core particle 110 may have a porosity of 0.07 cc/g, or less, and in particular, 0.025 cc/g, or less.

As described above, it is preferable that the graphite core particle 110 according to the present invention has no pores. When the porosity is more than 0.07 cc/g, the carbon layer 130 can seep into the pores of the graphite core particle 110, thereby reducing the thickness of the carbon layer 130. Thus, it may be difficult to secure the metal particles 120 on or around the surface of the graphite core particle 110, resulting in poor cycle-life characteristics.

The porosity of the metal-graphite composite is measured with powder of an electrode plate including the negative electrode active material 100, which is disassembled in a discharged state, from a battery cell. The measured porosity may be 0.08 cc/g, or less, and in particular, 0.03 cc/g, or less.

The carbon layer 130 may be formed by annealing a polymer material, such as a vinyl-based resin, a cellulose-based resin, a phenol-based resin, a pitch-based resin, or a tar-based resin. The carbon layer 130 may be in an amorphous state (relatively un-graphitized). When the carbon is in an amorphous state, an electrolyte may not significantly penetrate the carbon layer 130, resulting in an increase in the charge/discharge efficiency of the negative electrode active material 100.

The carbon layer 130 has a low reactivity to the electrolyte and acts as a reaction protection layer that prevents the dissolution of the electrolyte, since it coats the metal particles 120, which have a relatively high reactivity to the electrolyte. In addition, the metal particles 120 are dispersed in the carbon layer 130, and particularly, on or around the surface of the graphite core particle 110, so that the metal particles 120 are not separated from the graphite core particle 110 and can all contribute to the charge/discharge reaction.

Here, the carbon layer 130 may be formed to a thickness of from about 1 to 4 μm. When the thickness of the carbon layer 130 is less than about 1 μm, it may be difficult to dispose the metal particles 120 on or around the surface of the graphite core particle 110, which could result in a reduction in the cycle-life characteristics of the negative electrode active material 100. When the thickness of the carbon layer 130 is more than about 4 μm, the irreversible capacity of the negative electrode active material 100 may increase.

The metal particles 120 are formed of a metallic material capable of forming an alloy with lithium and which can reversibly intercalate and deintercalate lithium ions. The metal particles 120 have a higher ability to intercalate lithium ions than the graphite core particle 110, so as to increase the total charge/discharge capacity of the negative electrode active material.

The metal particles 120 can include at least one selected from the group consisting of Cr, Sn, Si, Al, Mn, Ni, Zn, Co, In, Cd, Bi, Pb, and V. According to some embodiments, the metal particles 120 are formed of Si, which has the highest theoretical capacity (4017 mAh/g) of the group.

The metal particles 120 have an average particle size of from 0.01 to 1.0 μm, for example, from 0.05 to 0.5 μm. When the metal particles 120 are smaller than 0.01 μm, the agglomeration of the metal particles 120 may be increased, resulting in non-uniform dispersion of the metal particles 120 in the carbon layer 130. Such non-uniformity may result in metal particles that are difficult to use powder form, and may increase the dissolution of the electrolyte, due to the large specific area thereof. On the other hand, when the metal particles 120 are larger than 1.0 μm, the absolute volume of the metal particles 120 may increase during charging/discharging, resulting in a reduction in capacity retention characteristics.

The metal particles 120 are capable of forming an alloy with lithium, and may reversibly intercalate lithium ions. As a result, the capacity of the negative electrode active material 100 may be increased, due to an increased intercalation/deintercalation of lithium ions, as compared to a conventional carbonaceous negative electrode active material.

The content of the metal particles 120 may be from 3 to 20 wt %, with respect to 100 wt % of the negative electrode active material 100. When the content of the metal particles 120 is less than 3 wt %, the energy density may be decreased. When the content of the metal particle is more then 20 wt %, the charge/discharge efficiency may be decreased.

Figure 2:
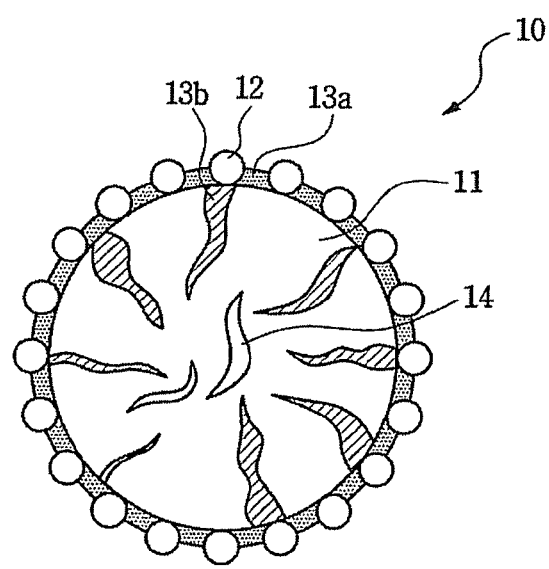
FIG. 2 is a schematic cross-sectional view of a conventional negative electrode active material.

FIG. 2 is a schematic cross-sectional view of a conventional negative electrode active material 10. Referring to FIG. 2, the conventional negative electrode active material 10 is formed of a graphite core particle 11, metal particles 12 disposed on the surface of the graphite core particle 11, and a carbon layer 13a coating the graphite core particle 11 and the metal particles 12.

In the negative electrode active material 100, according to aspects of the present invention, the metal particles 120 are dispersed in the carbon layer 130, and thus, are disposed on or adjacent to the surface of the graphite core particle 110. However, in the conventional negative electrode active material 10, the metal particles 12 are attached to the surface of the graphite core particle 11, and then the graphite core particle 11 and the metal particles 12 are coated with the carbon layer 13a.

Since the conventional graphite core particle 11 has a high porosity, as shown in FIG. 2, the carbon layer 13a infiltrates pores 14 of the graphite core particle 11. Thus, when the conventional carbon layer 13a is formed of the same amount of material as the carbon layer 130, the conventional carbon layer 13a forms a thinner coating. As a result, the conventional carbon layer 13a fails to adequately secure the metal particles 12 to the graphite core particle 11, resulting in reduced cycle life characteristics.

Figure 3A:
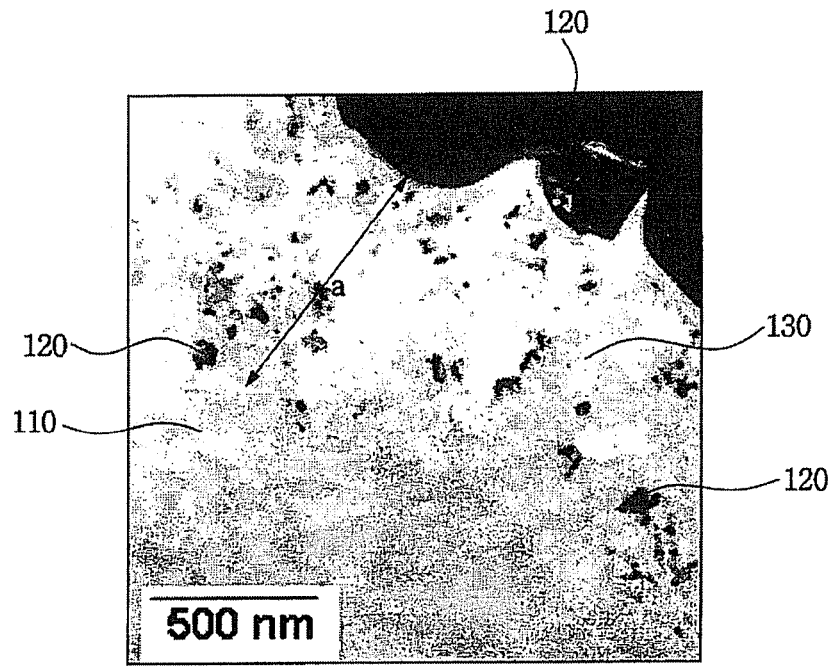
FIG. 3A is a micrograph showing a cross-section of an exemplary negative electrode active material, according to aspects of the present invention.
Figure 3B:
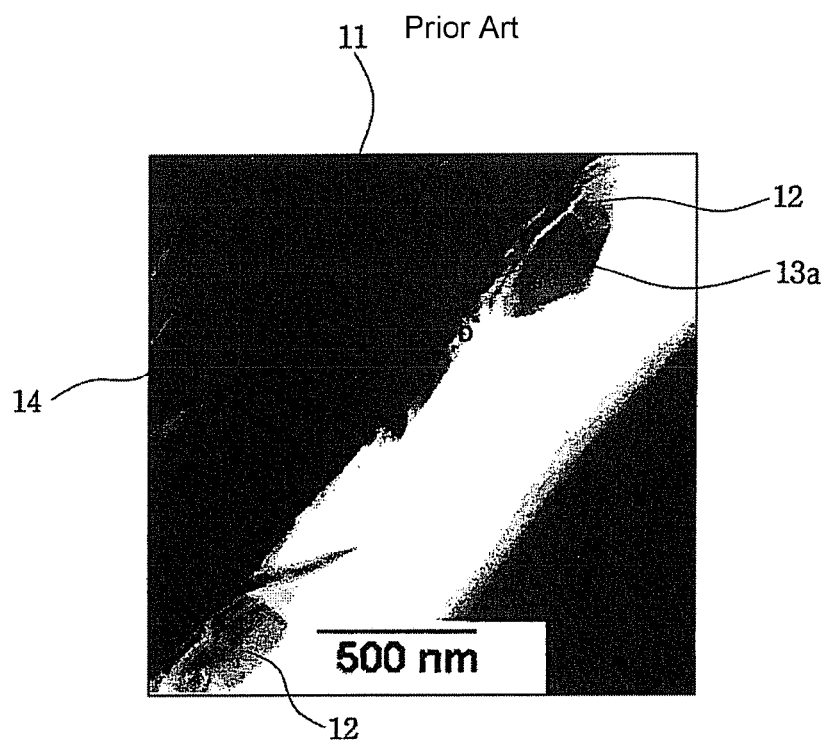
FIG. 3B is a micrograph showing a cross-section of a conventional negative electrode active material.

FIG. 3A is a micrograph showing a cross-section of the negative electrode active material 100, according to aspects of the present invention, and FIG. 3B is a micrograph showing a cross-section of the conventional negative electrode active material 10. Referring to FIG. 3A, the negative electrode active material 100 includes the graphite core particle 110, the carbon layer 130 coating the graphite core particle 110, and the metal particles 120 dispersed in the carbon layer 130. Since the graphite core particle 110 is substantially nonporous, the thickness (a) of the carbon layer is relatively large.

However, referring to FIG. 3B, the conventional negative electrode active material 10 is formed of the graphite core particle 11, the metal particles 12 disposed on the surface of the graphite core particle 11, and the carbon layer 13a coating the graphite core particle 11 and the metal particles 12. Since the carbon layer 13a seeps into the pores 14, the carbon layer 13a has a much smaller thickness (b). Due to the reduction of the thickness of the carbon layer 13a, the metal particles 12 are not securely attached to the graphite core particle 11, resulting in reduced cycle life characteristics.

A method of forming a negative electrode active material, according to aspects of the present invention, will now be described. First, the graphite core particles 110 are prepared. The graphite core particles 110 can be formed of any suitable material, such as artificial graphite having a porosity of 0.07 cc/g, or less, and in particular, 0.025 cc/g, or less.

A wet method is used to mix equal volumes of metal particles and a carbon precursor, to form a precursor solution. The precursor solution is coated on graphite core particles and then dried at 80° C. The resultant material is annealed at 800° C. for 4 hours, in a nitrogen atmosphere, to form a metal-graphite composite. The carbon precursor may include amorphous carbon and a resin.

The metal particles can be selected from the group consisting of Cr, Sn, Si, Al, Mn, Ni, Zn, Co, In, Cd, Bi, Pb, and V. In particular, the metal particles can be Si particles having to an average particle size of 200 nm, or less. The Si particles may be formed by pulverization, using a ball mill, a jet mill, or an attrition mill (attritor), but the present invention is not so limited. Alternatively, the negative electrode active material may be deflocculated prior to use.

The conventional method of forming a negative electrode active material is similar to the method described above, except that in the conventional negative electrode active material, porous graphite core particles are used, and a certain amount of the carbon layer is disposed in the pores, thereby decreasing the thickness of the carbon layer. For this reason, the metal particles are not strongly bound to the graphite core particles, resulting in reduced cycle-life characteristics.

That is, in the conventional negative electrode active material, the metal particles may affect other elements of a battery, due to their expansion in the negative electrode, or may react with an electrolyte. In addition, when the volume of the metal is reduced during discharging, it may not be completely restored to its original state. Accordingly, there is much space around the metal particles, resulting in the electrical isolation of the active materials, a reduction in capacity, and a degradation of battery performance.

In contrast, the graphite core particles utilized in exemplary embodiments of the present invention have a low porosity, allowing the carbon layer to sufficiently coat the metal particles. Therefore, it is easy to disperse the metal particles in the carbon layer. The negative electrode active material, according to aspects of the present invention, can strongly bind the metal particles, due to the above-mentioned carbon layer, and thus, the volume expansion thereof is reduced, thereby improving cycle-life characteristics.

A lithium secondary battery, according to aspects of the present invention, will now be described. The battery includes an electrode assembly disposed in a can with an electrolyte. The electrode assembly includes a negative electrode, a positive electrode, and a separator disposed there between.

The negative electrode includes a negative electrode collector, which is coated with a negative electrode active material. The negative electrode collector may be formed of copper or a copper alloy. The negative electrode collector may be in the form of a foil, a film, a sheet, a punched-type, a porous-type, or a foamy-type.

Then, the lithium secondary battery having the negative electrode active material according to the present invention includes a positive electrode having a positive electrode active material, a negative electrode having a negative electrode active material, a separator separating the positive electrode from the negative electrode, and an electrolyte. Here, the negative electrode active material is the same as described above.

The positive electrode may include a positive electrode collector that is coated with a positive electrode active material that can reversibly intercalate lithium ions. Examples of the positive electrode active material include lithium-transition metal oxides, such as $LiCoO_2$, $LiNiO_2$, $LiMnO_2$, $LiMn_2O_4$, and $LiNi_{1-x-y}Co_xM_yO_2$ ($0 \leq x \leq 1$, $0 \leq y \leq 1$, $0 = x+y \leq 1$, and M is metal such as Al, Sr, Mg or La). However, the present invention is not so limited.

The positive electrode collector may be formed of aluminum or an aluminum alloy. The positive electrode collector may be in the form of a foil, a film, a sheet, a punched-type, a porous-type, or a foamy-type. The separator may be formed of a resin layer, such as a polyethylene or a polypropylene; or a porous layer formed by coupling a ceramic material and a binder, but the present invention is not so limited.

The electrolyte includes a non-aqueous organic solvent, e.g., a carbonate, an ester, an ether, or a ketone. The carbonate may include dimethyl carbonate (DMC), diethyl carbonate (DEC), dipropyl carbonate (DPC), methyl propyl carbonate (MPC), ethylpropyl carbonate (EPC), methylethyl carbonate (MEC), ethylene carbonate (EC), propylene carbonate (PC), or butylene carbonate (BC). The ester may include butyrolactone (BL), decanolide, valerolactone, mevalonolactone, caprolactone, n-methyl acetate, n-ethyl acetate, or n-propyl acetate. The ether may include dibutyl ether, and the ketone may include polymethylvinyl ketone. However, the present invention is not so limited.

When the non-aqueous organic solvent is a carbonate-based organic solvent, it may be formed by mixing a cyclic carbonate with a chain carbonate, at a volume ratio of from 1:1 to 1:9, or more specifically, from 1:1.5 to 1:4. In these ranges, the electrolyte may exhibit proper performance.

The electrolyte may further include an aromatic hydrocarbon-based organic solvent, as well as the carbonate-based solvent. The aromatic hydrocarbon-based organic solvent may be an aromatic hydrocarbon-based compound. Specifically, the aromatic hydrocarbon-based organic solvent may include benzene, fluorobenzene, chlorobenzene, nitrobenzene, toluene, fluorotoluene, trifluorotoluene, or xylene. The volume ratio of the carbonate-based solvent to the aromatic hydrocarbon-based solvent may be from 1:1 to 30:1. In these ranges, the electrolyte mixture may exhibit proper performance.

In addition, the electrolyte includes a lithium salt, which acts as a source of lithium ions for the basic operation of the battery. The lithium salt includes at least one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}F_{2x+1}SO_2)(C_yF_{2x+1}SO_2)$ (x and y are natural numbers), and $LiSO_3CF_3$.

The lithium salt may have a concentration of from 0.6 to 2.0M, and more specifically, from 0.7 to 1.6M. When the concentration of the lithium salt is less than 0.6M, the conductivity of the electrolyte may decrease. When the concentration of the lithium salt is more than 2.0M, the viscosity of the electrolyte may be increased, decreasing the mobility of the lithium ions.

The positive electrode, the negative electrode, and the separator are stacked together and then wound into a jellyrolltype shape, to form the electrode assembly. The electrode assembly is inserted into the can, and then the electrolyte is injected into the can, completing the lithium secondary battery. The can may be, for example, cylindrical, rectangular, or pouch-type.

Hereinafter, examples and comparative examples of the present invention will be described. The examples are provided only to understand the aspects of the present invention, and thus, the present invention is not limited to the following examples.

Example 1

$LiCoO_2$, a polyvinylidene fluoride (PVDF) binder, and a conductive carbon material were mixed, at a weight ratio of 92:4:4, to form a mixture. The mixture was dispersed in N-methyl-2-pyrollidon to form a positive electrode slurry. The slurry was coated on 20 μm thick aluminum foil, dried, and rolled to form a positive electrode.

Silicon particles were mixed with pitch-based carbon to form a mixture. The mixture was then coated on graphite core particles, thereby forming a metal-graphite composite including graphite core particles coated with a carbon layer having the silicon particles dispersed therein.

The metal-graphite composite was dry-mixed with 20 μm artificial graphite, at a ratio of 7:3. The resultant was mixed with, a styrene-butadiene rubber binder and a carboxymethylcellulose thickener, at a weight ratio of 96:2:2, and then dispersed in water, thereby forming a slurry. The slurry was coated on a 15 μm copper foil, dried, and rolled to form a negative electrode having a negative electrode active material coating.

The core graphite particles had a porosity of 0.025±0.01 cc/g, or less. The carbon layer was coated on the core graphite particles to a thickness of about 3 μm. The porosity of the metal-graphite composite was 0.03±0.02 cc/g. A 20 μm separator formed of a polyethylene (PE) film was introduced between the positive and negative electrodes, and the resulting structure was wound, pressed, and inserted into a cylindrical can. Then, an electrolyte was injected into the cylindrical can, thereby manufacturing a lithium secondary battery.

Example 2

The method of Example 1 was repeated, except that core graphite particles having a porosity of 0.07±0.03 cc/g were coated with a 1 μm thick carbon layer, to form a metal-graphite composite. The metal-graphite composite had porosity of 0.08±0.02 cc/g. Then, a lithium secondary battery was manufactured using the negative electrode material, in the same manner as in Example 1.

Comparative Example 1

$LiCoO_2$, a PVDF binder, and a conductive carbon material were mixed at a ratio of 92:4:4. The resulting mixture was dispersed in N-methyl-2-pyrollidon, to form a slurry. The slurry was coated on 20 μm thick aluminum foil, dried, and rolled to form a positive electrode. Silicon particles were attached to the surfaces of graphite core particles, and then the graphite core particles were coated, with the same amount of pitch-based carbon as in Example 1, thereby forming a comparative metal-graphite composite, which was used to form a negative electrode active material.

That is, in order to form the carbon layer, in Example 1, the silicon particles were mixed with the pitch-based carbon, and then the graphite core particles were coated with the pitch-based carbon/silicon particle mixture, forming a carbon layer on the graphite core particles. However, in Comparative Example 1, the silicon particles were attached to the surfaces of the graphite core particles and then coated with the pitch-based carbon, to form a comparative metal-graphite composite.

The comparative metal-graphite composite was dry-mixed with 20 μm artificial graphite, at a ratio of 7:3. The resultant mixture was mixed with a styrene-butadiene rubber binder, and a carboxymethylcellulose thickener, at a weight ratio of 96:2:2, and then dispersed in water, thereby forming a slurry. The slurry was coated on 15 μm thick copper foil, dried, and rolled to form a comparative negative electrode having a negative electrode active material coating.

In Comparative Example 1, the core graphite had a porosity of 0.14±0.02 cc/g, and the carbon layer had a thickness of about 200 μm. The metal-graphite composite had a porosity of 0.15±0.03 cc/g. A 20 μm thick separator formed of a polyethylene (PE) film was introduced between the positive and negative electrodes, and the resultant structure was wound, pressed, and inserted into a cylindrical can. An electrolyte was injected into the cylindrical can, thereby manufacturing a comparative lithium secondary battery.

Comparative Example 2

The method of Comparative Example 2 was repeated, except that core graphite particles having a porosity of 0.09±0.03 cc/g were used, and a 300 μm thick carbon layer was formed. The resulting comparative metal-graphite composite had a porosity of 0.10±0.02 cc/g.

The lithium batteries in Examples 1 and 2 and Comparative Examples 1 and 2 were charged to 4.35V and discharged to 2.5V, for 100 cycles, at a current density of 1 C. Then, the charge/discharge efficiencies at the $1^{st}$ cycle (ratio of discharge capacity to a charge capacity) and the capacity retention ratio at the $100^{th}$ cycle to the $1^{st}$ cycle, were measured. The measurement results are shown in Table 1, below.

TABLE 1

|  | Porosity of Metal-Graphite Composite (cc/g) | Charge/ discharge Efficiency at the $1^{st}$ cycle (%) | Capacity Retention Ratio at the $100^{th}$ cycle (%) |
| --- | --- | --- | --- |
| Example 1 | 0.03 | 90 | 80 |
| Example 2 | 0.08 | 89 | 78 |
| C. Example 1 | 0.15 | 87 | 45 |
| C. Example 2 | 0.10 | 88 | 60 |

From the results shown in Table 1, it can be noted that Examples 1 and 2 exhibited better charge/discharge efficiencies at the $1^{st}$ cycle than Comparative Examples 1 and 2. Further, it can be noted that Examples 1 and 2 exhibited higher capacity retention ratios at the $100^{th}$ cycle than Comparative Examples 1 and 2.

In more detail, when the negative electrode active materials of Comparative Examples 1 and 2 were repeatedly charged and discharged, the metal particles likely expanded, and/or became dislodged from the corresponding negative electrodes. In addition, when the metal particle volume was decreased during discharging, it likely was not completely restored to its original state. Thus, gaps were likely formed around the meal particles, insulating the metal particles, and resulting in the decreases in electrical capacity and battery performance. However, in the negative electrode active material according Examples 1 and 2, the metal particles were strongly bound by the carbon layer, resulting in less expansion and improved cycle-life characteristics.

Consequently, a negative electrode active material, according to aspects of the present invention, has a reduced volume change, and thus, results in a secondary battery having improved cycle-life characteristics.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A negative electrode active material, comprising:
a graphite core particle;
a carbon layer coating the graphite core particle; and
metal particles dispersed in the carbon layer;
wherein the graphite core particle, the carbon layer, and the metal particles form a metal-graphite composite having a porosity of from 0.03 to 0.08 cc/g;
wherein the graphite core particle has a porosity of from 0 to 0.025 cc/g; and
wherein the carbon layer is coated to an average thickness of from 1 to 4 µm.

2. The negative electrode active material according to claim 1, wherein the graphite core particle is formed of one selected from the group consisting of artificial graphite, natural graphite, graphitized carbon fiber, graphitized mesocarbon microbeads, amorphous carbon, and a combination thereof.

3. The negative electrode active material according to claim 1, wherein the metal particles are formed of one selected from the group consisting of Cr, Sn, Si, Al, Mn, Ni, Zn, Co, In, Cd, Bi, Pb, V, and a combination thereof.

4. A negative electrode, comprising:
a negative electrode collector; and
a negative electrode active material coated on the negative electrode collector, the negative electrode active material comprising,
a graphite core particle, a carbon layer coating the graphite core particle, and metal particles dispersed in the carbon layer;
wherein the graphite core particle, the carbon layer, and the metal particles form a metal-graphite composite having a porosity of from 0.03 to 0.08 cc/g;
wherein the graphite core particle has a porosity of from 0 to 0.025 cc/g; and
wherein the carbon layer is coated to an average thickness of from 1 to 4 µm.

5. A lithium secondary battery, comprising: a positive electrode comprising a positive electrode active material;
a negative electrode comprising a negative electrode active material, the negative
electrode active material comprising, a graphite core particle, a carbon layer coating the graphite core particle, and metal particles dispersed in the carbon layer; a separator to separate the positive electrode and the negative electrode; and
an electrolyte to immerse the positive and negative electrode;
wherein the graphite core particle, the carbon layer, and the metal particles form a metal-graphite composite having a porosity of from 0.03 to 0.08 cc/g;
wherein the graphite core particle has a porosity of from 0 to 0.025 cc/g; and
wherein the carbon layer is coated to an average thickness of from 1 to 4 µm.

* * * * *